(12) United States Patent
Everitt (10) Patent No.: US 7,746,352 B2
(45) Date of Patent: Jun. 29, 2010

(54) DEFERRED PAGE FAULTING IN VIRTUAL MEMORY BASED SPARSE TEXTURE REPRESENTATIONS

(75) Inventor: Cass W Everitt, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 824 days.

(21) Appl. No.: 11/611,081

(22) Filed: Dec. 14, 2006

(65) Prior Publication Data

US 2008/0106552 A1    May 8, 2008

Related U.S. Application Data

(63) Continuation-in-part of application No. 11/556,622, filed on Nov. 3, 2006.

(51) Int. Cl.
G06T 11/40 (2006.01)
G09G 5/00 (2006.01)

(52) U.S. Cl. ...................................... 345/552; 345/582
(58) Field of Classification Search ................. 345/552, 345/582
See application file for complete search history.

(56) References Cited

U.S. PATENT DOCUMENTS 6,111,584 A * 8/2000 Murphy ...................... 345/582
6,744,438 B1 * 6/2004 Baldwin ...................... 345/552
7,151,544 B2 * 12/2006 Emberling .................. 345/582
7,164,426 B1 * 1/2007 Duluk et al. ................. 345/564
7,324,116 B2 * 1/2008 Boyd et al. .................. 345/582

OTHER PUBLICATIONS

Tanenbaum, Modern Operating Systems, 2001, Prentice Hall, Upper Saddle River, New Jersey, Second Edition, pp. 202-203, 206-214.*
Tanenbaum, Modern Operating Systems, 2nd Edition, *Memory Management*, Chapter 4, 2001, pp. 202-214.

* cited by examiner

Primary Examiner—Kee M Tung
Assistant Examiner—Jacinta Crawford
(74) Attorney, Agent, or Firm—Townsend and Townsend and Crew LLP (57) ABSTRACT

A virtually-addressed local texture memory stores selected regions (a sparse representation) of a texture for use by a graphics processor. The graphics processor requests a texel of the texture by referencing a virtual address of the texel. A memory interface references an address map to determine whether the requested texel is in one of the regions of the texture that is resident in the local texture memory. If so, the texel is retrieved from the local memory and used in the rendering operation; if not, an alternative texel that is resident in the local memory is retrieved and used in the rendering operation. Non-resident regions that include requested texels are retrieved from a primary texture data store at regular intervals (e.g., once per frame) and stored in local texture memory for use in a subsequent rendering operation.

16 Claims, 5 Drawing Sheets

DEFERRED PAGE FAULTING IN VIRTUAL MEMORY BASED SPARSE TEXTURE REPRESENTATIONS

CROSS-REFERENCE TO RELATED APPLICATION

This application is a continuation-in-part of application Ser. No. 11/556,622, filed Nov. 3, 2006, entitled "Virtual Memory Based Sparse Texture Representations," which disclosure is incorporated herein by reference for all purposes.

BACKGROUND OF THE INVENTION

The present invention relates generally to a virtual memory subsystem and more specifically to the representation of textures in a virtual memory space.

In many three-dimensional (3D) graphics applications, texture is used to model surface features of an object. A texture can be used to represent attributes that may vary across a surface, e.g., color, brightness, surface normal, transparency, reflectivity, and the like. Once a texture is defined, the texture may be mapped to any three-dimensional object, e.g., by associating texture coordinates with each vertex of the object and interpolating to determine texture coordinates for points between the vertices. The texture coordinates map to data values ("texels") that represent the attribute at a particular point in the texture coordinate space. The texel for a particular point (pixel) on the surface can be used directly or blended with other information descriptive of pixel attributes (including other textures) to generate a final pixel value. For faster rendering, texture data is stored in memory local to the graphics processor, allowing the graphics processor to access the data when needed.

Achieving increased realism in rendered images involves, among other things, using larger and more complex textures to model surface features in finer detail. The texture data required often exceeds the capacity of the local memory in a graphics subsystem. Consequently, textures may need to be stored in a texture database, which is usually maintained on disk or other high-capacity storage media. However, most graphics processors cannot access data stored in such storage media without intervention by the application program (which can be triggered, e.g., using a CPU interrupt); thus, rendering operations are slowed or made impossible.

The problem of storing and accessing large textures is exacerbated in the case of mip-mapping. A mip-map is a texture map that includes multiple copies of a texture at different resolutions (levels of detail, or LOD). For instance, an initial texture of 1024×1024 texels (the highest LOD) might be filtered to 512×512, 256×256 and so on down to 1×1 (the lowest, or coarsest, LOD). When an object is rendered, texels at a level of detail commensurate with the size of the fragment in texture space are obtained by selecting the appropriate LOD map (or in some cases maps), rather than by performing filtering of large kernels on the original high-resolution texture. Mip-mapping thus reduces the need to perform filtering at runtime, at the cost of additional space required to store the mip-map. For instance, in typical mip-maps, each higher (finer) LOD has four times as many texels as the previous (coarser) LOD. Thus, the amount of memory required increases rapidly with increasing detail. Where local graphics memory is at a premium, it is often not possible to store an entire mip-map in local memory. Further, as the number of texels in a particular LOD map increases, the likelihood that all of them will be used in rendering decreases; thus, storing the entire mip-map in local memory can be wasteful.

To avoid storing the entire mip-map, "clip-map" techniques have been developed. A clip-map is a partial mip-map in which some (or all) levels of detail are clipped to a specified size. The standard, full-size mip-map is stored in a remote memory or other less expensive storage area. The clip-map, representing a subset of the complete mip-map and therefore requiring less memory, can be stored in local memory so that it can be accessed by the graphics processor. However, the clip-map is limited to representing only a single rectangular region per mip-map level; texels outside this region are only available from the remote memory. As noted above, access to the remote memory may require intervention by the application program, and such intervention may be too slow for real-time rendering.

It would therefore be desirable to provide techniques for efficient access to needed portions of texture data.

BRIEF SUMMARY OF THE INVENTION

Embodiments of the present invention provide techniques for using a virtually-addressed local texture store (e.g., in local memory of a graphics processor) to store selected regions of a texture for use by a graphics processor. During a rendering operation, the graphics processor requests a texel by referencing a virtual address of the texel; the virtual address can be determined, e.g., from the base address of the texture in virtual memory, the texture coordinates and, in the case of a mip-map texture, the level of detail (LOD). A memory interface references a page table (or other address map) to determine whether the virtual address of the requested texel maps to an address in the local texture store (in other words, whether the requested texel is resident in the local texture store). If the texel is resident, the texel is retrieved from the local texture store and used in the rendering operation. If the texel is not resident, an alternative texel that is resident is retrieved from local memory and used in the rendering operation. The alternative texel might be, e.g., a texel corresponding to the same texture coordinates at a coarser level of detail or default data from a selected region (e.g., a border region) at the same level of detail. A page fault that would normally result from the absence of the originally requested texel is advantageously deferred. Instead, the originally requested texel is flagged as having been requested while rendering operations continue using the alternative texel. At a convenient time (e.g., once per frame), requested texels that are not present in the local texture store are retrieved from the primary texture store (e.g., on disk or in remote memory) and added to the local texture store for use in a subsequent rendering operation (e.g., the next rendering pass for the same object).

According to one aspect of the present invention, a method for rendering an image is provided. A mapping is defined from texture coordinates to virtual addresses for each texel in a texture that includes a number of regions (e.g., corresponding in size to a memory page) of texel data. A subset of the regions of the texel data is stored in a local texture store. The virtual addresses corresponding to the stored subset of the regions are mapped to respective physical addresses of the stored subset of regions in the local texture store. A first texel of the texture is requested by reference to a first virtual address. In the event that the first texel is stored in the local texture store, the first texel is retrieved from the local texture store. In the event that the first texel is not stored in the local texture store: a virtual address of an alternative texel that is stored in the local texture store is determined, the alternative texel is retrieved, and the first texel is identified as requested but non-resident. Pixel data for the image is rendered using the retrieved texel (either the first texel or the alternative texel, depending on whether the first texel is in the local texture store). The pixel data is stored in a memory. After rendering the pixel data, in the event that the first texel is requested but non-resident, a region of texel data that includes the first texel is retrieved from a primary texture store that stores the entire texture, the retrieved region is stored in the local texture store, thereby making the first texel available to a subsequent rendering operation.

According to another aspect of the present invention, a system for rendering an image includes a primary texture store, a local texture store, an address map, a memory interface, and a texture unit. The primary texture store is configured to store a texture that includes a number of regions of texel data; a mapping is defined from texture coordinates to virtual addresses for each texel of the texture. The local texture store is configured to store a subset of the regions of the texel data at a number of physical addresses. The address map is configured to map the virtual addresses corresponding to the stored subset of regions to the physical addresses of the stored subset of regions. The address map includes a plurality of access bits corresponding to each region of the texel data. The access bits including a first access bit indicating whether the corresponding region is one of the stored subset of regions and a second access bit indicating whether a texel in the corresponding region has been requested. The memory interface, which is communicably coupled to the address map and the local texture store, is configured to retrieve data requested by reference to a virtual address from the local texture data store and to indicate whether a virtual address for which data is requested maps to a physical address for the stored subset of regions. The memory interface is further configured to update the second access bit in the event that a virtual address for which data is requested does not map to a physical address for the stored subset of regions.

The texture unit, which is communicably coupled to the memory interface, is configured to request a first texel of the texture by reference to a first virtual address and, in the event that the memory interface indicates that the first virtual address does not map to any of the stored subset of regions, to request an alternative texel of the texture. The texture unit is further configured to receive the requested texel and to render pixel data for an image using the received texel. The memory interface is further configured to use the second access bits to identify one or more regions of texel data to be retrieved from the primary texture store, to retrieve the one or more regions from the primary texture store, and to store the retrieved one or more regions in the local texture store, thereby making texels of the one or more regions available to a subsequent rendering operations.

The following detailed description together with the accompanying drawings will provide a better understanding of the nature and advantages of the present invention.

DETAILED DESCRIPTION OF THE INVENTION

Figure 1:
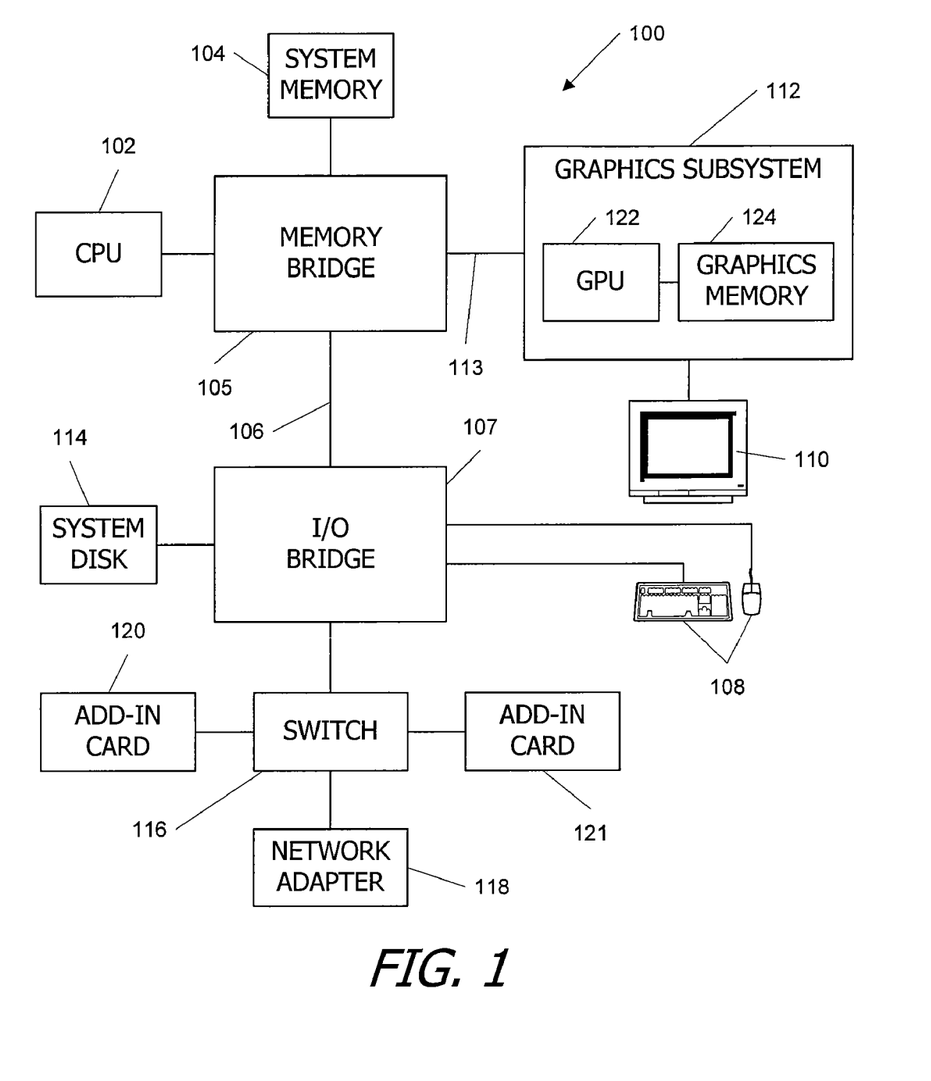
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate (render) pixel data from 2-D or 3-D scene data provided by various programs executing on CPU 102. In the course of rendering, GPU 122 advantageously uses virtual memory techniques to manage a texture mip-map, as described below. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Figure 2:
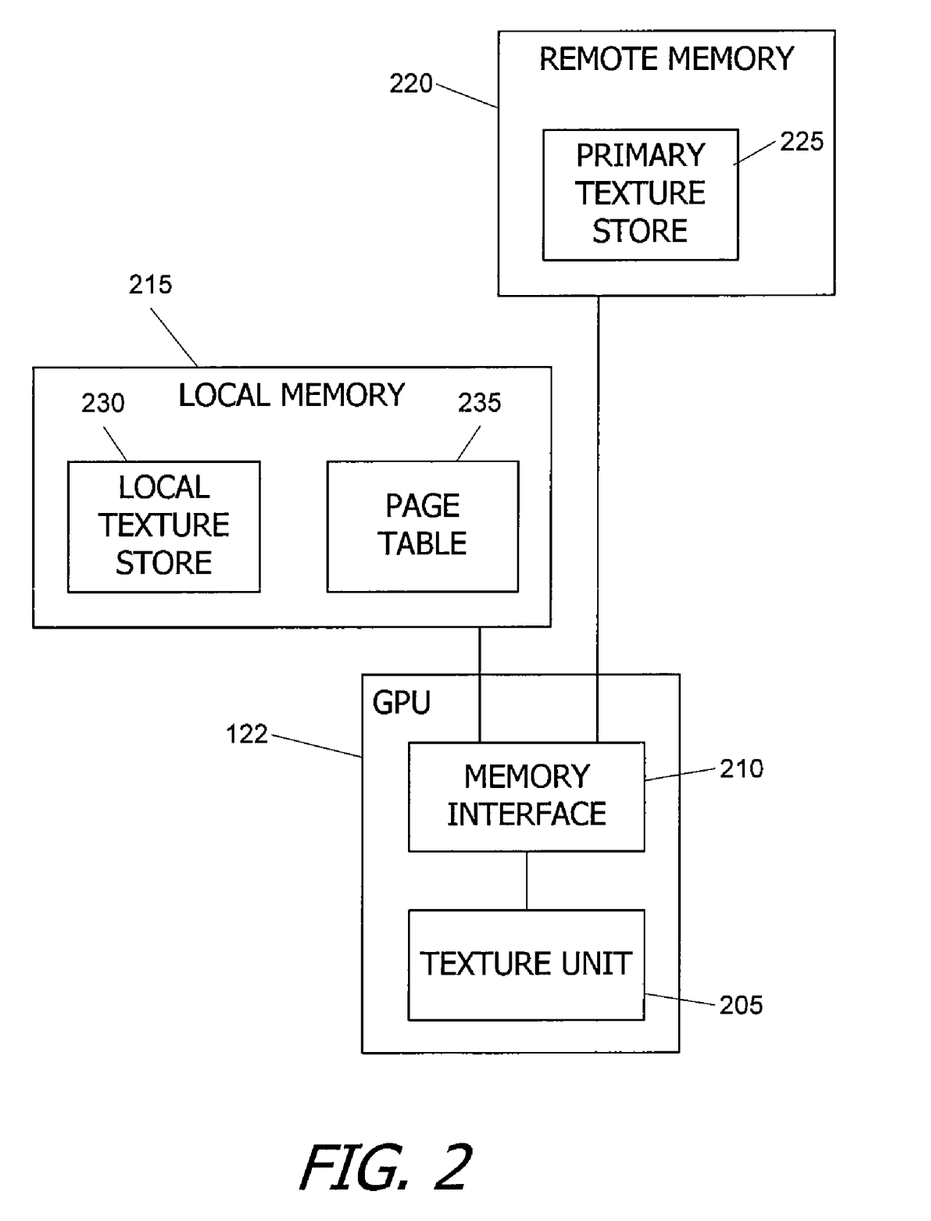
FIG. 2 is a block diagram showing memory connections of a graphics processor according to an embodiment of the present invention.

FIG. 2 is a block diagram showing memory connections of a GPU 122 according to an embodiment of the present invention. GPU 122 includes a texture unit 205 communicably coupled to a memory interface 210. It is to be understood that GPU 122 may also include other components (not explicitly shown), such as other rendering pipeline components and/or a scanout (display) engine and that such components may communicate with memory interface 210 to read data from and/or write data to various memory devices external to GPU 122.

Memory interface 210 manages communication between GPU 122 and various external memory devices, including a local memory 215 and a remote memory 220. As used herein, "local memory" refers to the external memory device(s) to which GPU 122 has lowest-latency access. In some embodiments, local memory 215 is dedicated graphics memory (e.g., graphics memory 124 of FIG. 1) provided on an expansion card together with GPU 122. In other embodiments (e.g., UMA embodiments), local memory 215 may be a region within system memory 104 of FIG. 1 that is allocated for use by GPU 122. "Remote memory" refers to other memory that can be used to store graphics-related data. In some embodiments, GPU 122 may be able to access remote memory 220 directly, albeit with longer latencies than accessing local memory 215; in other embodiments GPU 122 may access remote memory 220 only indirectly (e.g., through interrupts sent to CPU 104).

Remote memory 220, which may include, e.g., portions of system memory 104 and/or system disk 114 of FIG. 1, includes a primary texture store 225. Primary texture store 225 stores all of the texture data used by a particular rendering application. The texture data may be arranged in memory in a conventional manner. In some embodiments, primary texture store 225 is a texture database maintained on disk or other high-capacity storage media.

Local memory 215 includes a local texture store 230, a region allocated for storing texture data. Local memory 215 also stores a page table 235 that facilitates virtual addressing of selected regions (or all) of local memory 215 and/or other memory resources accessible to GPU 122. In accordance with an embodiment of the present invention, local texture store 230 is managed using virtual addressing.

As is known in the art, virtual addressing is an indirect memory access technique in which program code executed by a processor specifies "virtual" memory addresses that are not permanently tied to any physical memory location. The processor maintains a mapping (e.g., in a page table) from the virtual addresses to the physical locations where the data resides. At execution time, the processor translates virtual addresses to physical addresses in order to access the data. In memory systems that support page swapping, virtual addressing allows the program to use an address space larger than the size of the available physical memory; for instance, data can be swapped between primary memory and secondary storage (e.g., a hard disk) as needed.

In the embodiment of FIG. 2, GPU 122 maintains virtual-to-physical address mappings for at least a portion of local memory 215 in page table 235. When memory interface 210 receives a memory request that references a virtual address, memory interface 210 accesses page table 235 to translate the virtual address to a physical address. If the physical address is in local memory 215, memory interface 210 sends the request to local memory 215. If the physical address is in remote memory 220, memory interface 210 initiates a request to remote memory 220; as noted above, such a request may be made directly or indirectly, depending on the particular system configuration.

In some embodiments, a texture (e.g., a mip-map texture) is loaded into primary texture store 225 in remote memory 220. Loading of the texture advantageously occurs prior to any rendering operations that use the texture. For instance, a graphics application program may provide the texture as application data that is loaded when the application is initialized. Alternatively, the texture may be generated using GPU 122, e.g., by executing a texture-generating process during application startup. Generation and loading of texture data are not critical to the present invention, and a detailed description is omitted.

Selected portions of the texture are also loaded into local texture store 230 in local memory 215, thereby providing a "sparse" representation of the texture. In some embodiments where the texture is a mip-map texture, the selected portions include the entire LOD map for the lowest (coarsest) level of detail, and portions of the LOD maps for other levels of detail. The portions of the LOD maps can be selected such that texels corresponding to different texture coordinates are stored for different levels of detail, and multiple non-contiguous portions of the LOD map for a single level of detail can be stored.

Figure 3:
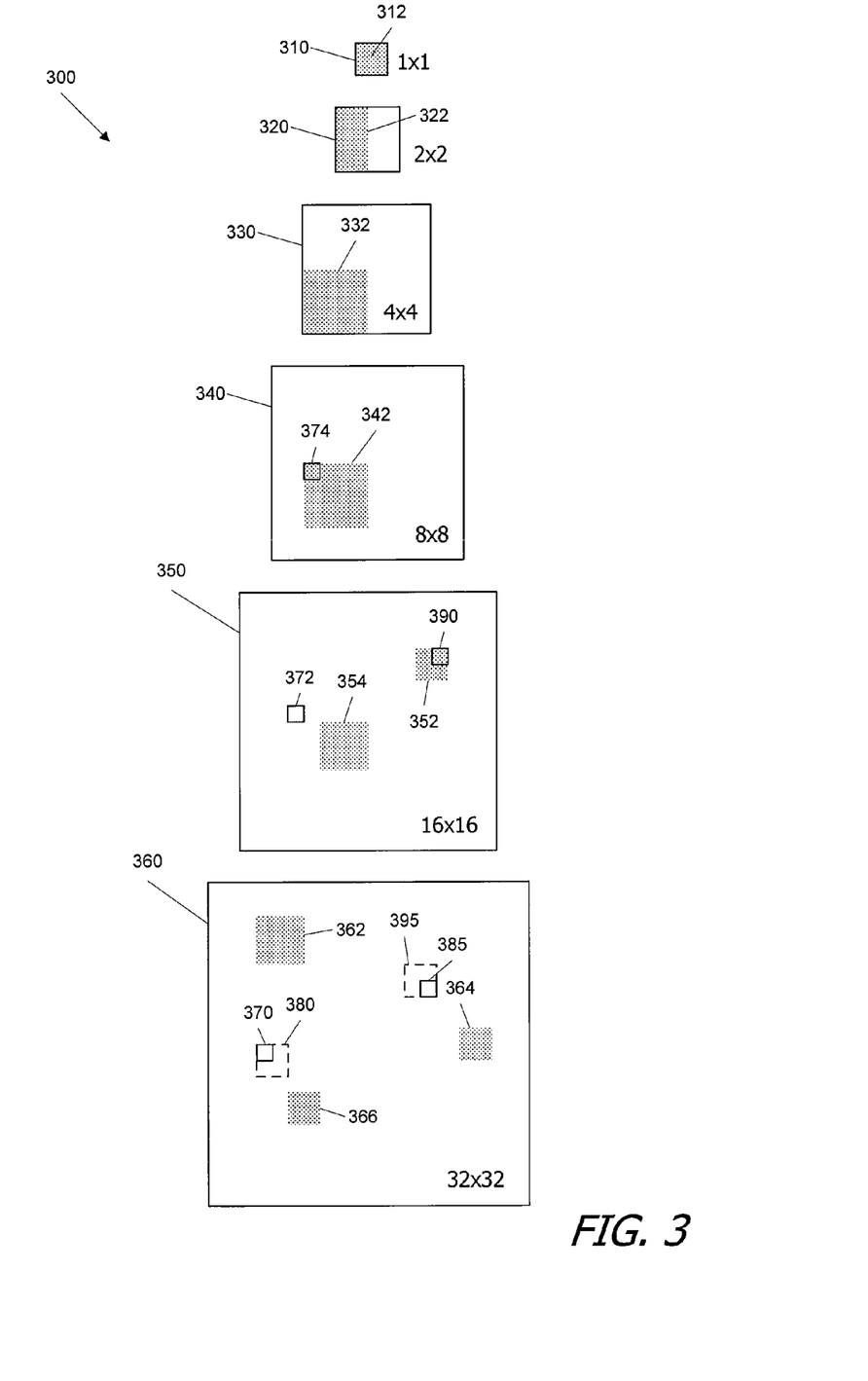
FIG. 3 is a simplified representation of a texture mip-map, illustrating portions of the mip-map that might be included in la sparse representation according to an embodiment of the present invention.

FIG. 3 is a simplified representation of a texture mip-map 300, illustrating portions of the mip-map that might be stored in local texture store 230 according to an embodiment of the present invention. The mip-map in this example includes six LOD maps 310, 320, 330, 340, 350, 360. LOD map 360 is the finest (highest) level of detail shown, at 32×32 texels; LOD map 310 is the coarsest (lowest) level of detail, at 1×1 texel. The entire mip-map 300 is stored in primary texture store 225. Shaded areas 312, 322, 332, 342, 352, 354, 362, 364, 366 represent the regions stored in local texture store 230; these regions constitute a sparse representation of the texture mip-map.

It is to be understood that the mip-map of FIG. 3 is illustrative. A mip-map may include any number of LOD maps, and the particular selection of regions of each LOD map to be stored in local texture store 230 may be varied as desired. In some embodiments, no regions of one or more of the LOD map are stored in local texture store 230. Further, the fraction of the mip-map that is stored in local texture store 230 may be varied, e.g., depending on the total size of the mip-map and the space available in local texture store 230. Thus, any subset of a texture mip-map may be stored in local texture store 230.

It is also to be understood that the present invention is not limited to mip-map textures. Selected portions of any texture can be loaded into local texture store 230 to provide a sparse representation of the texture. Sparse representations can be provided for any texture data, including but not limited to 2D mip-maps, 3D mip-maps, cube maps, texture arrays, volume textures in three dimensions, and so on. Any subset of the texture-space regions in which a texture is defined may be included in a sparse representation, and any fraction (less than 100%) of the total texture may be included in the sparse representation.

Regardless of the type of texture, the entire texture is advantageously mapped to virtual addresses. In one embodiment, the mapping is performed on a per-page basis, where a page corresponds to a fixed-size unit of memory (e.g., 4 KB) and may include any number of texels. For instance, if each texel is 4 bytes, each 4-KB page would include 1 K texels. For each virtual address (at the page level), page table 235 stores the location in primary texture store 225 where the corresponding page of texel data can be found. In addition, if the page is resident in local texture store 230, page table 235 also stores the physical address of the location in local texture store 230 where that page resides. When virtual addresses are mapped to physical addresses, addresses in local texture store 230 are selected in preference to addresses in primary texture store 225.

In an alternative embodiment, page table 235 stores physical addresses for pages that are resident in local texture store 230 but not for pages that are resident only in primary texture store 225. In the latter case, page table 235 stores information indicating that the page is "not resident" in local texture store 230; an alternative page table (not shown) can be used to determine where the data is resident.

In accordance with an embodiment of the present invention, the page table entry in page table 235 for each page of the texture is associated with at least two access bits. One access bit identifies whether that page is resident in local texture store 230. For pages that are not resident, another access bit indicates whether the page includes a texel that has been requested by texture unit 205 during the rendering process.

Figure 4:
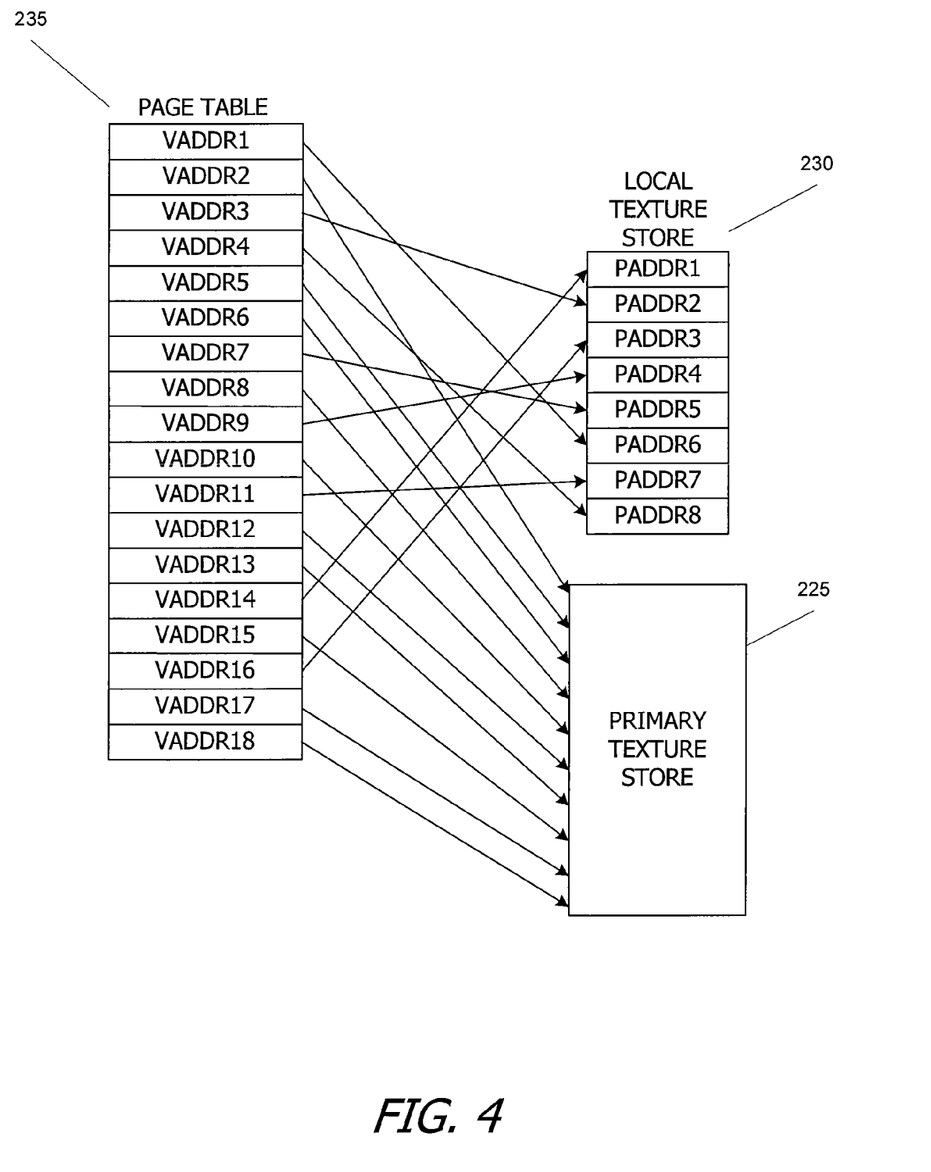
FIG. 4 is a block diagram illustrating a page table that maps virtual addresses for a texture to texture data in memory according to an embodiment of the present invention.

FIG. 4 illustrates mapping of virtual addresses to physical addresses for a sparse texture representation according to an embodiment of the present invention. In this example, page table 235 includes virtual addresses VADDR1-VADDR18, each of which corresponds to a page of addressable memory. Local texture store 230 includes a smaller number of addressable physical pages PADDR1-PADDR8. Virtual addresses VADDR1, VADDR3, VADDR7, VADDR9, VADDR11, VADDR14, and VADDR16 map to the physical pages in local texture store 230. The remaining virtual addresses do not map to pages in local texture store 230; in the embodiment shown, these addresses map to primary texture store 225.

During rendering, an object can be mapped to the texture such that each point on the object is mapped to a point in the texture coordinate space. For example, in the case of a 2D mip-map texture, each vertex of the object may be mapped to specific coordinates (u, v) in the texture coordinate space. Within a rendering pipeline of GPU 122, texture unit 205 uses coordinate mapping information to identify (e.g., by interpolating between vertices) a texel (or multiple texels) corresponding to each pixel. To use the texture mip-map, texture unit 205 also determines the appropriate LOD (p) from which the texel at coordinates (u, v) should be fetched. The mip-map coordinates (u, v, p) are then used to determine a virtual address ($V_0$) for a texel to be fetched; determining mip-map coordinates and converting the mip-map coordinates to an address can be done using conventional techniques. More generally, regardless of the type of texture, a virtual address corresponding to each texel can be defined.

Texture unit 205 issues a read request, including the virtual address $V_0$, to memory interface 210. Memory interface 210 accesses page table 235 to determine whether the requested texel is resident in local texture store 230 (e.g., whether virtual address $V_0$ is in a page that is resident in local texture store 230). If the texel is resident, memory interface 210 retrieves the requested texel from local texture store 230 and delivers it to texture unit 205. Texture unit 205 can then perform texture-blending operations using the retrieved texel; such operations may be conventional in nature and are not critical to understanding the present invention.

If the texel is not resident in local texture store 230, memory interface 210 notifies texture unit 205. Texture unit 205 can then issue a revised request for an alternative texel, e.g., by generating an alternative set of texture coordinates and determining the virtual address corresponding to the alternative coordinates.

For instance, in one embodiment where the texture is a mip-map texture, the alternative texel is a texel corresponding to the same (u, v) coordinates at a different level of detail. Thus, texture unit 205 might determine revised mip-map coordinates (u, v, p') where p' is a different LOD selected based on the originally requested LOD p. In one embodiment, p'=p−1 (for the next coarser LOD map).

In other embodiments, e.g., where the texture is not a mip-map texture, the alternative texel is a texel corresponding to coordinates (u', v') in a different region of the same LOD map. Alternative texels for mip-map textures can also be selected in this fashion. For instance, it might be known that the subset of regions stored in local texture store 230 always includes a "safe" region for each LOD map, e.g., a rectangular region corresponding to texture coordinates ($u_0$, $v_0$) to ($u_1$, $v_1$). This safe region might be, e.g., a border or corner of the region covered by the texture map. If the originally requested texel is not locally resident, the alternative texel might be selected using the original LOD coordinate p and new (u, v)

coordinates selected such that u is between $u_0$ and $u_1$ and v is between $v_0$ and $v_1$. Other choices for an alternative texel (e.g., a default color) might also be implemented.

Once the new texture coordinates are determined, texture unit 205 generates a new virtual address ($V_1$) from the new texture coordinates and makes another request to memory interface 210. Memory interface 210 again accesses page table 235 to determine whether the requested virtual address $V_1$ corresponds to a page that is resident in local texture store 230, and the process repeats until eventually texture unit 205 requests a texel that is present.

An attempt to access a virtual address that does not map to a page resident in local memory 215 conventionally results in a page fault, in which case the memory interface 210 waits until the requested page is retrieved from primary texture store 225. This could stall operation of texture unit 205. In accordance with an embodiment of the present invention, a page fault is deferred. Instead, information identifying non-resident pages that contain requested texels is stored, and such pages are retrieved from primary texture store 225 at a time that does not unduly interfere with rendering operations of texture unit 205.

To facilitate deferred retrieval of non-resident pages, texture unit 205 or memory interface 210 advantageously keeps track of "misses," i.e., requests where the originally requested texel was not resident. From time to time (e.g., once per frame), texture unit 205 or memory interface 210 may provide information regarding misses to another process, such as the application program, graphics driver program, operating system, or a hardware-implemented memory management process, and the other process can use that information to determine whether to obtain a page from primary texture store 225. Thus, some but not all misses might result in a request for a new page from primary texture store 225.

In some embodiments, texture unit 205 or memory interface 210 keeps track of misses using access bits that are associated with each page table entry in page table 235. Whenever a texel from a non-resident page is requested, an access bit associated with the page table entry for that page is set to indicate that the page was requested. Retrieval of that page is deferred to a convenient time. More specifically, at regular intervals during the rendering process (e.g., once per frame), memory interface 210 (or texture unit 205) references the access bits to identify which non-resident pages of the texture include the requested texels. At that time, memory interface 210 retrieves the non-resident pages containing the requested texels from primary texture store 225 and adds those pages to local texture store 230. Alternatively, memory interface 210 or texture unit 205 may provide information identifying the non-resident requested pages to another process, and that process may apply additional logic to determine whether to request the non-resident page. It should be noted that deferring retrieval of requested pages in this manner does not slow down rendering operations, which proceed using an alternative texel as described above.

To allow rendering operations to proceed without waiting for access to primary texture store 225, it may be desirable to provide one or more pages of "default data" in local texture store 230 and map virtual addresses for all pages that are not locally resident to a page of the default data. This default data may correspond to texels that approximate texture data for the region of the LOD map that is not locally resident; for instance, texels from a border region of the LOD might be used. Multiple pages of the virtual address space can be mapped to the same page of default data; for instance, one page from each LOD map of a mip-map could be used as the default data, and each page in the virtual address space that is not resident in local texture store 230 can be mapped to the page of default data for the appropriate LOD map. When texture unit 205 requests a texel that is not resident in local texture store 230, memory interface 210 returns the default data.

In some embodiments, memory interface 210 uses the access bits to determine whether the page is resident in local texture store 230 or whether it is non-resident and therefore mapped to default data. In the latter case, memory interface 210 can set the second access bit to indicate that the non-resident page was requested. Alternatively, texture unit 205 may be able to determine whether the texel data returned by memory interface 210 corresponds to the requested texel or the default data, e.g., by reference to a flag or other information included with the data. If texture unit 205 determines that the requested texel was not returned, texture unit 205 can then initiate a request for the appropriate page from primary texture store 225. Rather than waiting for this request to be completed, texture unit 205 advantageously proceeds, using the default data as the alternative texel; retrieval of the appropriate page is deferred to a convenient time.

Once the requested page is added to local texture store 230, page table 235 is advantageously updated to reflect that the page is now locally resident, and the texels of that page can be used in subsequent rendering operations (e.g., a subsequent rendering pass for the same object). In some embodiments, if local texture store 230 is already filled with texture data, a page that has not been accessed in a while may be replaced with the newly retrieved page; conventional least-recently-used or other algorithms may be used to determine which page to replace.

Figure 5:
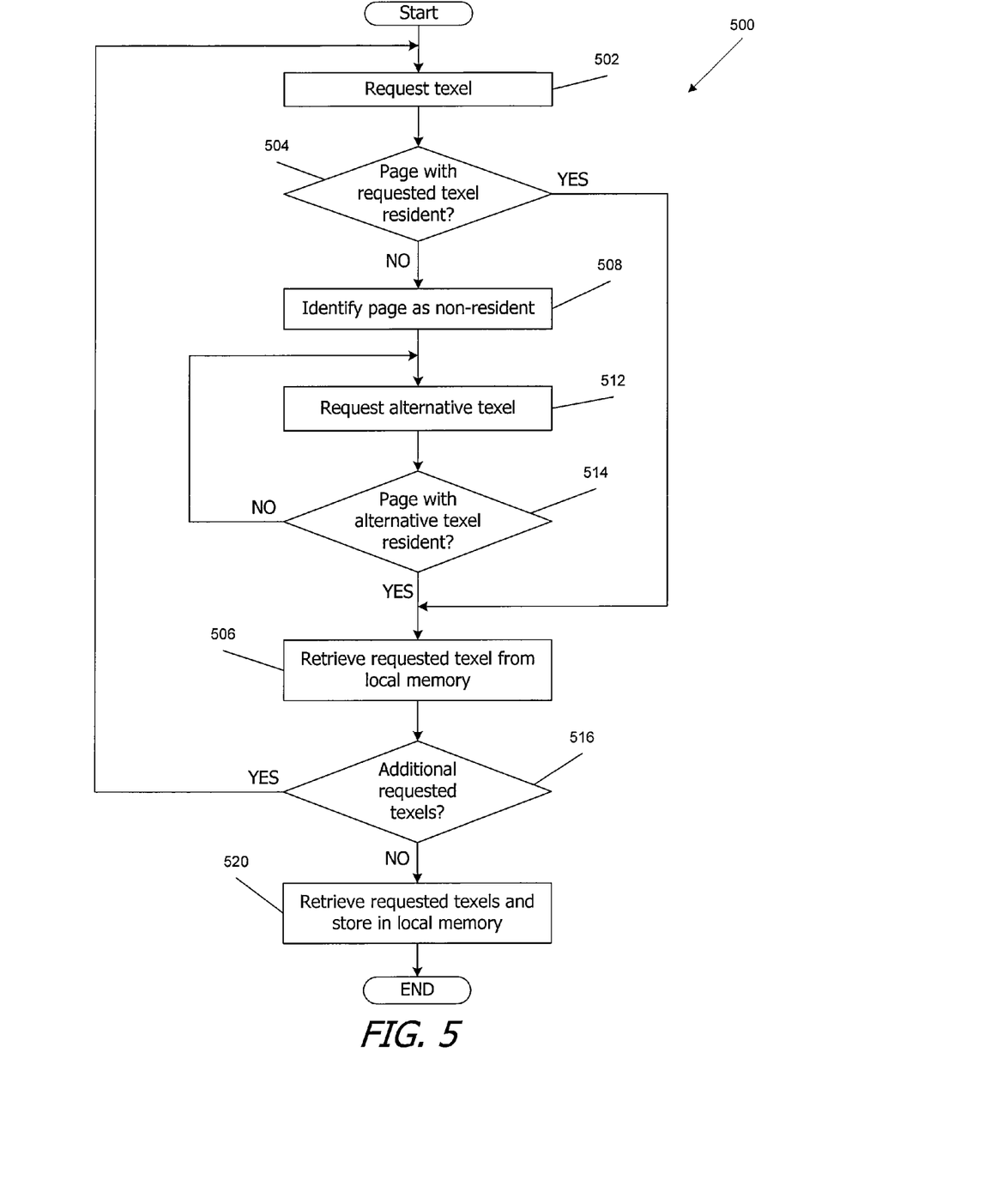
FIG. 5 is a flow diagram of a process for retrieving a texel from a sparsely represented texture according to an embodiment of the present invention.

FIG. 5 is a flow diagram of a process for retrieving a texel from a sparsely represented texture according to an embodiment of the present invention. At step 502, texture unit 205 requests a particular texel (e.g., a texel from a particular LOD map in a mip-map texture), by referencing a virtual address associated with the texel. In the embodiment of FIG. 1, this request may be a part of a rendering operation performed by GPU 122 in response to instructions from an application program (e.g., a video game) executing on CPU 102.

At step 504, a determination is made as to whether the page that includes the requested texel is resident in local texture store 230. In one embodiment, page table 235 (FIGS. 2 and 3) is referenced to determine whether the page is resident in local texture store 230, as described above. If the page is resident, then at step 506, the requested texel is retrieved from local texture store 230.

If the page that includes the requested texel is not resident in local texture store 230, the page is identified as being non-resident at step 508. Identifying the page as non-resident advantageously does not trigger a page fault. Instead, an access bit associated with the non-resident page is activated to identify the page as including a requested texel. At step 512, texture unit 205 requests an alternative texel (e.g., a texel from the next coarser LOD map of a mip-map texture). If, at step 514, the page containing the alternative texel is not available, process 500 returns to step 512, and texture unit 205 requests a different alternative texel (e.g., a texel from the next coarser LOD map). This loop continues until a texel that is resident in local texture store 230 is requested, at which point (step 506) the requested texel is retrieved from local texture store 230 and returned to texture unit 205.

Once a requested texel (either the originally requested texel or an alternative texel) has been retrieved from local texture store 230, that texel can be used to generate pixel data for an image, e.g., using conventional texture-filtering techniques. The pixel data is advantageously stored in a frame buffer, from which it can subsequently be displayed on a display device. The particular manner in which texture data is used in rendering is not critical to the present invention, and a detailed description has been omitted.

At step 516, a determination is made whether texture unit 205 is expected to request additional texels (e.g., whether the current frame or rendering pass has been completed). If so, then process 500 returns to step 502 to process the next request.

Once all requests for the current frame or rendering pass have been processed, texture unit 205 or memory interface 210 requests that all of the non-resident pages that contain requested texels be retrieved from primary texture store 225 and stored in local texture store 230 at step 520. A request for texels from primary store 225 may be made at regular intervals during the rendering process (e.g., once per frame). By deferring the page faults and requesting the non-resident pages from primary texture store 225 at regular intervals while rendering continues using alternative texels, repeated interruptions in the rendering process related to retrieval of non-resident texels are avoided.

For example, referring to FIG. 3, suppose that texels 370, 385 in LOD map 360 of mip-map 300 are originally requested. Texels 370, 385 are not resident in local texture store 230 (in this example, only texels in shaded regions are resident in local texture store 230). Texture unit 205 activates access bits that are associated with each page of mip-map 300 to identify non-resident pages 380, 395 as including requested texels. Any page faults that may result from requesting non-resident pages 380, 395 are deferred. Instead, texture unit 205 requests alternative texels 372, 390 from LOD map 350. Texel 390 is resident in local texture store 230, but texel 372 is not resident, so texture unit 205 requests another alternative texel 374 from LOD map 340. Texels 374, 390, which are resident in local texture store 230, are retrieved and used in the rendering operation. If the entire LOD map for the coarsest LOD (e.g., 1×1 LOD map 310) is resident in local texture store 230, process 500 will eventually result in a texel being retrieved.

At regular intervals during the rendering process (e.g., once per frame), texture unit 205 references the access bits that are associated with each page of mip-map 300 to identify any non-resident pages that include requested texels and to request such pages from primary texture store 225. For example, in the scenario just described, texture unit 205 would request retrieval of pages 380 and 395 from primary texture store 225 because each of these pages contains at least one requested texel (texels 370, 385). The requested pages 380, 395 would then be retrieved and added to local texture store 230. As noted above, if local texture store 230 has insufficient space to store newly-retrieved pages 380, 395, one or more pages in local texture store 230 that have not been accessed recently may be evicted in favor of the new pages 380, 395. Conventional algorithms (e.g., least-recently used algorithms) may be used to determine whether to evict a page and if so, which page to evict.

Texture unit 205 advantageously does not wait for a requested page (e.g., page 380 or 395) to be retrieved from the primary texture store; instead, it proceeds with an alternative texel as described above. This allows processing to continue rather than waiting for a long-latency access to primary texture store 225, thus improving throughput. Any page faults that may result from requesting non-resident pages are advantageously deferred to a convenient time, in order to minimize interruptions and delays in the rendering process. Once the requested pages are retrieved, those pages can be used in subsequent rendering operations, such as in a next rendering pass for the same object.

It will be appreciated that the process described herein is illustrative and that variations and modifications are possible. Steps described as sequential may be executed in parallel, order of steps may be varied, and steps may be modified or combined. As noted above, various techniques may be used for selecting an alternative texel; e.g., rather than selecting the alternative texel from a different LOD map, the alternative texel might be selected from a different region of the same LOD map (e.g., a default region as described above). In embodiments where virtual addresses for which the corresponding page of texture data is not resident map to default data, the default data might be used to provide the alternative texel; in such embodiments, texture unit 205 generates only one request per texel regardless of whether the texel is resident. In some embodiments, rather than retrieving all of the non-resident pages that include requested texels at regular intervals in the rendering process, a subset of the non-resident pages that include requested texels may be retrieved. For instance, multiple access bits might be used to count the number of times texels from a particular non-resident page are requested; only pages whose access counts exceed a particular threshold might be retrieved.

In embodiments where texture unit 205 is programmable, the process for retrieving a texel described herein can be implemented in software, e.g., by supplying suitable program code for execution by the programmable texture unit. In other embodiments, the texture unit circuitry can be configured to implement this process. For instance, the configuration data associated with each texture that is to be applied may indicate whether the texture is sparsely represented in local texture store 230.

Using the techniques described herein, it is possible to allocate a relatively small (and fixed) amount of local memory for storing recently accessed regions of a larger texture as a sparse representation. The regions to be stored locally are selected, at least to some extent, based on use. In embodiments described herein, the regions are selected at the granularity of a page. It should be noted that pages corresponding to two or more non-contiguous regions of the same LOD map may be locally resident at the same time. Further, the locally stored pages for each LOD map are selected independently of other LOD maps; that is, locally resident pages from different LOD maps might or might not correspond to the same region of the texture coordinate space. Similarly, for other types of textures, any subset of the available regions in texture coordinate space, including two or more non-contiguous regions, might be included in the sparse representation.

While the invention has been described with respect to specific embodiments, one skilled in the art will recognize that numerous modifications are possible. For instance, the size of the local texture store can be as large or small as desired, and a sparse representation stored therein can include any subset of a texture. A mip-map texture may include any number of LOD maps, and texels may be of any size (e.g., 1 byte, 2 bytes, 4 bytes, etc.). Multiple textures (including mip-map textures and/or other types of textures) can be managed using sparse representations as described herein; each such texture is advantageously assigned to a different region in virtual address space.

Sparse representation of textures is not limited to mip-map textures or to 2D texture spaces. For example, sparse representations may also be used in connection with medical visualization applications. In such applications, data obtained through CT scans, MRI scans or the like is represented using a 3D texture; the total size of the texture can be quite large. Typically only a small fraction (e.g., less than 50%) of this texture data is needed to render a particular image. A sparse representation, which supports local storage of an arbitrary subset of the texture data, is advantageously used. Thus, it is to be understood that the present invention can be applied to any type of texture data in any rendering application.

While embodiments described herein may make reference to specific hardware and/or software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as compact disc (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method for rendering an image, the method comprising:
   (a) defining a mapping from texture coordinates to virtual addresses for each texel in a texture that includes a plurality of regions of texel data;
   (b) storing a subset of the regions of the texel data in a local texture store;
   (c) mapping the virtual addresses corresponding to the stored subset of the regions to respective physical addresses of the stored subset of regions in the local texture store;
   (d) requesting a first texel of the texture by reference to a first virtual address;
   (e) in the event that the first texel is stored in the local texture store, retrieving the first texel from the local texture store; and
   (f) in the event that the first texel is not stored in the local texture store,
      (1) determining a virtual address of an alternative texel that is stored in the local texture store;
      (2) retrieving the alternative texel; and
      (3) identifying the first texel as requested but non-resident; and
   (g) rendering pixel data for the image using the retrieved texel;
   (h) storing the pixel data in a memory; and
   (i) after rendering the pixel data, in the event that the first texel is requested but non-resident:
      (1) retrieving a region of texel data that includes the first texel from a primary texture store that stores the entire texture; and
      (2) storing the retrieved region in the local texture store, thereby making the first texel available to a subsequent rendering operation.

2. The method of claim 1 wherein identifying the first texel as requested but non-resident includes referencing an access bit associated with the first virtual address to identify the region as including a requested texel.

3. The method of claim 1 wherein retrieving a region of texel data that includes the first texel from a primary texture store further comprises retrieving a plurality of regions of texel data, each region including a requested texel.

4. The method of claim 3 wherein storing the retrieved region in the local texture store further comprises storing the plurality of retrieved regions of texel data in the local texture store, thereby making the requested texels available to the subsequent rendering operation.

5. The method of claim 1 wherein act (i) is performed at a prescribed point in the rendering process.

6. The method of claim 5 wherein the prescribed point occurs once per rendered frame.

7. The method of claim 1 further comprising determining whether the first texel is stored in the local texture store by referencing a page table that maintains mappings of the virtual addresses corresponding to the stored subset of regions to the physical addresses of the stored subset of regions.

8. The method of claim 7 wherein storing the retrieved region in the local texture store includes updating the page table to indicate that the retrieved region is stored in the local texture store.

9. The method of claim 1 wherein storing the retrieved region in the local texture store includes, in the event that the local texture store is full, replacing a region already stored in the local texture store with the retrieved region.

10. The method of claim 9 wherein replacing a region includes:
    determining which of the regions currently in the local texture store is least recently used; and
    replacing the least recently used region with the retrieved region.

11. The method of claim 1, wherein the first texel has first texel coordinates and is in a first LOD map of the texture and wherein the act of determining the virtual address of the alternative texel includes:
    selecting, as the alternative texel, a texel having the first texture coordinates that is in an LOD map of the texture other than the first LOD map.

12. The method of claim 11, wherein the alternative texel is in an LOD map corresponding to a coarser LOD than the first LOD map.

13. A system for rendering an image, the system comprising:
    a primary texture store configured to store a texture including a plurality of regions of texel data, wherein a mapping is defined from texture coordinates to virtual addresses for each texel of the texture;
    a local texture store configured to store a subset of the regions of the texel data at a plurality of physical addresses;
    an address map configured to map the virtual addresses corresponding to the stored subset of regions to the physical addresses of the stored subset of regions, the address map including a plurality of access bits corresponding to each region of the texel data, the access bits including a first access bit indicating whether the corresponding region is one of the stored subset of regions and a second access bit indicating whether a texel in the corresponding region has been requested;
    a memory interface communicably coupled to the address map and the local texture store and configured to retrieve data requested by reference to a virtual address from the local texture data store and to indicate whether a virtual address for which data is requested maps to a physical address for the stored subset of regions, the memory interface being further configured to update the second access bit in the event that a virtual address for which data is requested does not map to a physical address for the stored subset of regions; and a texture unit communicably coupled to the memory interface and configured to request a first texel of the texture by reference to a first virtual address and, in the event that the memory interface indicates that the first virtual address does not map to any of the stored subset of regions, to request an alternative texel of the texture;

wherein the texture unit is further configured to receive the requested texel and to render pixel data for an image using the received texel, and wherein the memory interface is further configured to use the second access bits to identify one or more regions of texel data to be retrieved from the primary texture store, to retrieve the one or more regions from the primary texture store, and to store the retrieved one or more regions in the local texture store, thereby making texels of the one or more regions available to a subsequent rendering operations.

14. The system of claim 13 wherein the memory interface is further configured to reference the first access bit associated with a requested region of texel data to determine whether the requested region is stored in the local texture store.

15. The system of claim 13 wherein the texture unit is further configured to retrieve the one or more regions of texel data at a prescribed point during the rendering process.

16. The system of claim 15 wherein the prescribed point is once per rendered frame.

* * * * *